(12) United States Patent
Char et al.

(10) Patent No.: US 7,900,298 B1
(45) Date of Patent: Mar. 8, 2011

(54) REFUND SAVING ACCOUNT MANAGER

(75) Inventors: Jason Char, San Diego, CA (US);
Justin C. Marr, San Diego, CA (US);
Kenichi Mori, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 165 days.

(21) Appl. No.: 12/335,209

(22) Filed: Dec. 15, 2008

(51) Int. Cl.
*G06F 17/22* (2006.01)
(52) U.S. Cl. .................................. 5/31; 705/35
(58) Field of Classification Search .............. 705/31, 705/35
See application file for complete search history.

(56) References Cited

U.S. PATENT DOCUMENTS

| | | | | |
|---|---|---|---|---|
| 4,890,228 | A * | 12/1989 | Longfield | 705/31 |
| 5,193,057 | A * | 3/1993 | Longfield | 705/31 |
| 5,724,523 | A * | 3/1998 | Longfield | 705/35 |
| 7,010,507 | B1 * | 3/2006 | Anderson et al. | 705/31 |
| 2004/0088233 | A1 * | 5/2004 | Brady et al. | 705/31 |

OTHER PUBLICATIONS

HMRC Lauches Campaign to Help Students Learn About Tax, Mar. 3, 2008, M2 Presswire.*
Heidi Vogt, Review: Turbotax, Taxcut Still Offer Value, Feb. 18, 2005, AP Online.*

* cited by examiner

*Primary Examiner* — Matthew S Gart
*Assistant Examiner* — Talia Crawley
(74) *Attorney, Agent, or Firm* — Osha • Liang LLP

(57) ABSTRACT

A method for managing a tax refund account by a taxpayer, comprising obtaining a tax refund account comprising financial information associated with the taxpayer, wherein the financial information comprises tax information, calculating a current refund balance representing a value of the tax refund account for the taxpayer contemporaneously with displaying the current refund balance, wherein the value of the tax refund account is based on the tax information of the taxpayer, displaying a list of contributions, wherein the list of contributions comprises a plurality of activities and a value associated with each of the plurality of activities, adjusting the current refund balance based on at least the list of contributions to obtain an estimated refund amount, and displaying the estimated refund amount comprising an estimated value of a tax refund.

22 Claims, 4 Drawing Sheets

REFUND SAVING ACCOUNT MANAGER

BACKGROUND

A large percentage taxpayers that receive a tax refund essentially use the refund as a primary savings account. Taxpayers rely on their tax refund for a variety of reasons, including paying for expenses incurred during the holiday season, costs associated with a vacation, paying for items of necessity, or paying for costs incurred due to an emergency. As debts and costs continue to rise, reliance on the tax refund will most likely become more widespread.

Taxpayers have a variety of options at their disposal to calculate an estimated tax refund (prior to actually filing the tax return), including tax professionals and various websites. Taxpayers (either alone or in conjunction with a tax professional) may estimate a tax refund by determining income during the previous year as well as taking into consideration tax contributions that may be considered to be tax credits or deductions, such as a 401K contribution, charitable donations, purchase of solar panels, medical costs, costs associated with a natural disaster, and/or payment of a tax (e.g. property tax).

Once a tax return is filed and processed by the IRS, taxpayers receive the tax refund either by deposit from the taxing authority directly into a bank account or by a check (or other kind of negotiable instrument) mailed from the taxing authority through a postal service.

SUMMARY

In general, in one aspect, the invention relates to a method for managing a tax refund account by a taxpayer, comprising: obtaining a tax refund account comprising financial information associated with the taxpayer, wherein the financial information comprises tax information; calculating a current refund balance representing a value of the tax refund account for the taxpayer contemporaneously with displaying the current refund balance, wherein the value of the tax refund account is based on the tax information of the taxpayer; displaying a list of contributions, wherein the list of contributions comprises a plurality of activities and a value associated with each of the plurality of activities; adjusting the current refund balance based on at least the list of contributions to obtain an estimated refund amount; and displaying the estimated refund amount comprising an estimated value of a tax refund.

In general, in one aspect, the invention relates to a system for managing a tax refund by a taxpayer, comprising: a tax refund account created for the taxpayer and comprising financial information associated with the taxpayer, wherein the financial information comprises tax information; and a graphical user interface (GUI) application executing on a processor and configured to: calculate a current refund balance representing a value of the tax refund account for the taxpayer contemporaneously with displaying the current refund balance, wherein the value of the tax refund account is based on the tax information of the taxpayer; display a list of contributions, wherein the list of contributions comprises a plurality of activities and a value associated with each of the plurality of activities; adjust the current refund balance based on at least the list of contributions to obtain an estimated refund amount; and display the estimated refund amount comprising an estimated value of the tax refund.

In general, in one aspect, the invention relates to a computer readable medium comprising instructions, which when executed by a processor perform: obtaining a tax refund account comprising financial information associated with the taxpayer, wherein the financial information comprises tax information; calculating a current refund balance representing a value of the tax refund account for the taxpayer contemporaneously with displaying the current refund balance, wherein the value of the tax refund account is based on the tax information of the taxpayer; displaying a list of contributions, wherein the list of contributions comprises a plurality of activities and a value associated with each of the plurality of activities; adjusting the current refund balance based on at least the list of contributions to obtain an estimated refund amount; and displaying the estimated refund amount comprising an estimated value of a tax refund.

Other aspects and advantages of the invention will be apparent from the following description and the appended claims.

DETAILED DESCRIPTION

Figure 1:
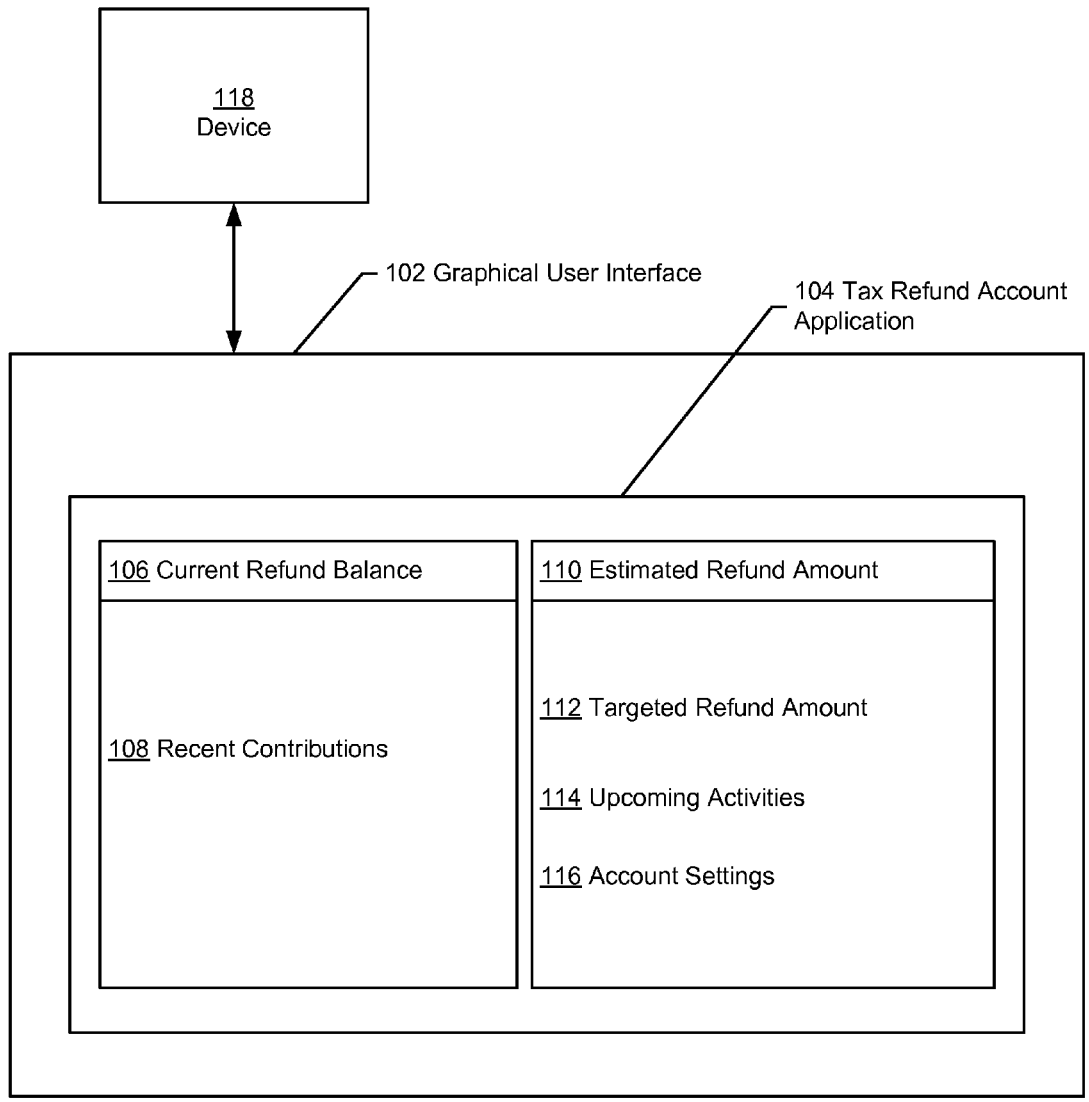
FIG. 1 shows a schematic diagram of a system in accordance with one or more embodiments of the invention

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a method and system for managing a tax refund savings account by allowing a user, using a computing device, to gain access to and manage a tax refund savings account ("refund account"). Specifically, the invention may allow for a user to access the refund account for a variety of reasons, including to view the current balance, to view a history of contributions toward the current year tax refund, to view the estimated refund amount, to set a targeted refund amount, as well as obtaining the tax refund after maturity of the refund account. In one or more embodiments of the invention, the refund account is accessed directly through a web browser or through a widget installed on a desktop PC, a phone (e.g., wireless or landline), a personal digital assistant, etc.

FIG. 1 shows a schematic diagram of a system in accordance with one or more embodiments of the invention. The system includes a computing device (118) and a graphical user interface (GUI) (102) that allows an individual to manage a tax refund account. The system and its components are described below.

In one or more embodiments of the invention, the tax refund account is accessed by interacting with the GUI (102). The GUI (102) may be generated by an application (e.g., an operating system, server application, client application, etc.)

(not shown) executing on a computing device (118). In one or more embodiments of the invention, the computing device (118) may be wired (i.e., connected to a network (e.g., a local area network (LAN), a wide area network (WAN), the Internet, etc.) via a wire) or wireless (i.e., connected to a network without a wire). The computing device (118) may take the form of a mobile device (e.g., a phone, personal digital assistant, a tablet, etc.), a personal computer, a handheld device, etc.

In one or more embodiments of the invention, the tax refund account application (104) is displayed as a GUI (102). An individual user may view and manage information that is relevant to the tax refund account by interfacing with the GUI (102). In one or more embodiments of the invention, the access to the tax refund account application (104) is automated and does not require direct use of a GUI (102). For example, the information may be gathered and displayed by text messaging (via SMS, etc.), command line interface, screen scraping by an application aggregating all financial information, etc. Upon viewing the tax refund account application (104), the individual user may be presented with information regarding the tax refund account, including a current refund balance (106), recent contributions (108) to the tax refund account, an estimated refund amount (110), an indicator to set the tax refund goal (112), and an indicator to schedule upcoming activities that will impact the tax refund (114). Optionally, the account settings (116) may be adjusted as necessary to customize the tax refund account application (104) to match the individual user or a taxing authorities peculiar preferences and/or requirements. Each of these elements of the tax refund account is described below.

In one or more embodiments of the invention, the tax refund account application (104) displays the current refund balance (106). The current refund balance (106) is an estimate of the amount the individual has contributed towards the current tax year refund, and, in one embodiment of the invention, is the most current (and accurate) estimate available. The current refund balance (106) is calculated by obtaining a list of recent contributions (108) and determining the impact to a potential refund that an activity within the list of recent contributions has on the tax refund.

In one or more embodiments of the invention, the recent contributions (108) are a list of recent activities within the tax refund account application (104). Recent contributions may include activities that contribute towards the current tax year refund. In one or more embodiments of the invention, activities may include tax withholdings residuals, estimated tax payments, tax savings from 401K contributions, mortgage payments, daycare, and/or charitable donations. The activities displayed as recent contributions (108) may include activities taking place within the current tax year or a shorter period of time (such as within the past month). In one or more embodiments of the invention, the individual may view recent contributions corresponding to a previous tax year for comparison purposes or to gather data necessary to determine the estimated refund amount (110) or a targeted refund amount (112). In one or more embodiments of the invention, the tax refund account application (104) allows the user to view information related to a previous tax year, allowing the user to view recent contributions (108) that may not apply to the current tax year.

In one or more embodiments of the invention, the tax refund account application (104) displays an estimated refund amount (110). The estimated refund amount (110) takes into consideration future activities that may impact the tax refund. In one or more embodiments of the invention, the tax refund account application (104) automatically takes into account recurring events or one-time events specific to the individual that may impact the tax refund. Examples of recurring events that may be taken into consideration when providing the estimated refund amount (110) include withholdings, monthly mortgage payments, 401K contributions, child care expense, as well as other deductions available to taxpayers. Example of one-time events include year-end mutual fund dividends and capital gain distributions, charitable donations, Individual Retirement Account (IRA) contributions, property tax payments, as well as other one-time events available to taxpayers that may impact the estimated refund amount (110).

In one or more embodiments of the invention, the individual may set (or determine) the targeted refund amount (112). In one or more embodiments of the invention, the targeted refund amount (112) is a value determined by the individual reflecting a targeted (or desired) tax refund amount for the tax year and may be changed throughout the tax year by the user. In one or more embodiments of the invention, the tax refund account application (104) automatically adjusts the tax withholding amounts deducted from each paycheck as needed to reach the targeted goal determined by the user. The tax refund account application (104) may also provide recommendations to the user to reach the targeted refund amount (112). For example, the a recommendation may be made to increase the 401K contribution. In one or more embodiments of the invention, the tax refund account application (104) may provide a recommendation by creating a pop-up window that notifies the user of a method to reach a targeted refund amount (112). The tax refund account application (104) may also provide a recommendation within the application itself by creating a space to display the recommendation (not shown). The recommendation (not shown) may also include alerts that may impact the targeted refund amount (112). For example, when the individual receives a larger than expected capital gains distribution from mutual funds, the individual receives a recommendation or alert that the targeted refund amount (112) may be impacted by this change or event (e.g., indicating that the targeted refund amount (112) is reached).

In one or more embodiments of the invention, the individual may schedule upcoming activities (114) that may impact the estimated refund amount (110) and go toward reaching the targeted refund amount (112). For example, when the individual expects to regularly contribute to a 401K account, the individual may schedule a weekly, bi-weekly, or monthly activity such that the estimated refund amount (110) can be adjusted accordingly. For example, the user may schedule monthly 401K contributions, and upon doing so, the estimated refund amount (110) is based on these monthly 401K contributions when calculating the value to be displayed within the tax refund account application (104).

In one or more embodiments of the invention, the individual may adjust account settings (116) or view account settings (116) regarding the tax refund account. The account settings may allow the individual to alter information (such as a taxpayer identification, password, etc.) that is specific to the individual. The account settings (116) may also allow the user to enter information regarding obtaining the tax refund at the end of the tax year. For example, once a completed tax return form (in one instance derived from information stored within the tax refund account application) is submitted to the government and the tax refund account matures, the user, after entering in bank information within the account settings (106), may transfer the balance of the tax savings account to a bank account specified within the account settings (106).

Figure 2:
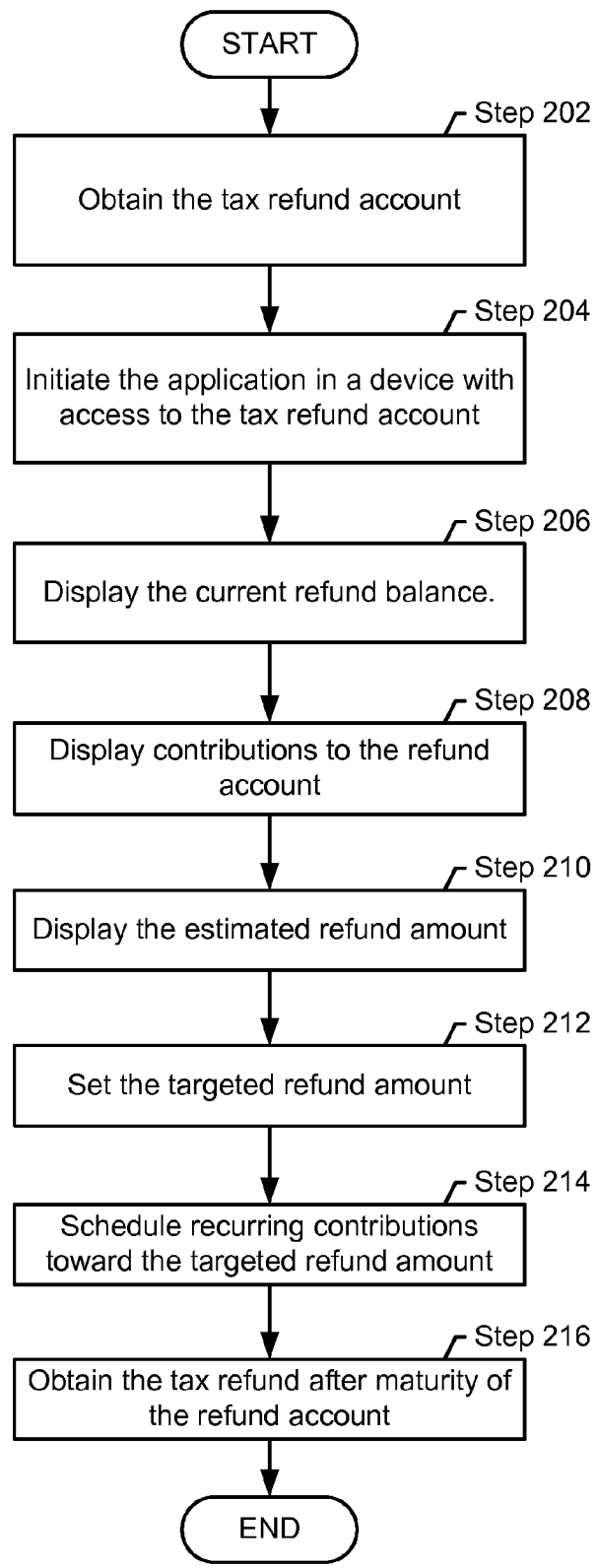
FIG. 2 shows a flowchart of a method in accordance with one or more embodiments of the invention.

FIG. 2 shows a flowchart of a method in accordance with one or more embodiments of the invention. Specifically, FIG.

2 shows a flowchart of a method for managing a tax refund account in accordance with one or more embodiments of the invention.

Initially, the tax refund account is obtained (Step 202). Obtaining the tax refund account may be done by initiating contact with the party responsible for maintaining the information that will be used to determine the estimated refund amount for the current tax year or by creating an account by using a computer with online access. In one or more embodiments of the invention, the account is obtained by leveraging existing information from another application (such as a financial management software) that stores financial information (e.g., tax, banking, payroll, etc.) and using that information to create the tax refund account.

Once the tax refund account is obtained, the individual can manage the account by accessing an application through a computing device (as shown in FIG. 1) that has access to the information needed to determine the current refund balance and/or the estimated refund amount (Step 204). Access to the application can be established through the Internet and access to the Internet can be granted through any number of devices that have such accessibility, such as a phone, a handheld device, or a computer.

In one or more embodiments of the invention, the user may access the information needed to determine the estimated refund amount by using an application that does not have online access. The application can store information regarding the tax refund account locally rather than storing it (for security reasons or otherwise). In such a case, the individual obtains access to the information (to synchronize, etc.) by using the Internet.

Upon gaining access to the application, the individual is presented with information regarding the tax refund account, including the display of the current refund balance (Step 206). As described above, the current refund balance is an estimate of the amount the individual has contributed-to-date towards the tax year refund in accordance with one or more embodiments of the invention.

Continuing with FIG. 2, the individual is subsequently presented with a list of contributions to the account (Step 208), in accordance with one or more embodiments of the invention. The list of contributions includes a variety of activities that contribute towards the tax year's refund. These activities may include tax withholding residuals, estimated tax payments, tax savings from 401K contributions, mortgage payments, child daycare, charitable donations, as well as other activities that may impact the list of contributions affecting the tax refund. The list of contributions may be limited to activities impacting only the current tax year refund. In one or more embodiments of the invention, the user may select only a portion of activities that are found in the list of contributions, including only displaying activities that have been recently performed (e.g., within the past month).

In one or more embodiments of the invention, the user may input a contribution that is added to the list of recent contributions upon saving the newly inputted contribution. For example, a user may input payment of a property tax that is tax-deductible, and upon inputting that payment, the tax refund account application then displays the newly inputted contribution in the list of recent contributions. The current refund balance may then be re-displayed (Step 206) to reflect the newly added contribution.

Continuing with FIG. 2, the estimated refund amount may also be displayed (Step 210) in accordance with one or more embodiments of the invention. In one or more embodiments of the invention, the estimated refund amount differs from the current refund amount by taking into account future payments or activities that impacts the refund balance going forward. In one or more embodiments of the invention, the estimated refund amount automatically takes into account recurring events specific to the individual. For example, weekly or monthly withholdings from a paycheck, monthly mortgage payments, 401K contributions, child care expenses, as well as other activities that can affect the estimated refund amount can be automatically calculated to determine the estimated refund amount.

In one or more embodiments of the invention, the tax refund account may also take into account one-time events specific to the individual in calculating the estimated refund amount. For example, year-end mutual fund dividends, capital gain distributions, major charitable donations, IRA contributions, property tax payments, as well as other activities that can affect the estimated refund amount can be automatically calculated to determine the estimated refund amount. Both the recurring events and the one-time events can be automatically determined based on available information. This information may include prior tax returns, other online accounts owned by the individual that may impact the individual's tax refund, and demographic data. For example, if the individual were to make a single charitable donation at the end of the prior tax year, the tax refund account can estimate that the individual will make a single charitable donation at the end of the current tax year and provide an estimated refund amount accordingly.

In one or more embodiments of the invention, upon displaying information relevant to the tax refund account application as stated in Steps 206-210, the individual may manually (and optionally) set a goal for a targeted refund amount (Step 212). The individual may wish to receive a large tax refund, so by adjusting the targeted refund amount, the individual may increase the tax refund from its current value.

Continuing with FIG. 2, calculating and monitoring the goal for a targeted refund amount can be performed in a variety of ways. In one or more embodiments of the invention, the tax refund account can automatically adjust the tax withholding amounts deducted from each paycheck earned by the individual as needed to reach the goal. The application can also provide recommendations for which the individual may be able to obtain the goal. For example, when the individual is seeking to increase the targeted refund amount, the application may display information that allows the individual to achieve this new goal, such as increasing a 401K contribution or paying additional property taxes. In addition, the user may be alerted to any events having occurred that may seriously impact the targeted refund amount goal set by the individual. For example, upon an event of a large capital gains distribution from the individual's mutual funds greater than a value expected by the individual occurring, the application notifies the individual that the targeted refund amount goal can no longer be reached, and that an adjustment to the tax refund account is necessary in order to achieve the targeted refund amount.

In one or more embodiments of the invention, after setting a goal, the individual may schedule recurring contributions towards the targeted refund amount, as deemed necessary (Step 214). For example, the individual may have a certain portion of their paycheck contributed to a 401K plan, and may enter in a recurring event into the application that calculates past, current, and future contributions based upon events setup by the individual.

Scheduling recurring events may impact the goal set by the individual for a targeted refund amount in accordance with one or more embodiments of the invention. As described above, upon entering the scheduling recurring events, the application may notify the individual that the targeted refund amount goal set by the individual may not be reached with the current settings in place and/or suggest corrective measures to reach the goal.

In one or more embodiments of the invention, upon completion of the tax year and maturity of the tax refund account, the user may obtain the tax refund based upon information entered into the application (Step 216). In order to estimate the value of the individual's tax refund, information relevant to the tax refund is obtained. This information can be used to partially or mostly complete the tax return for the current tax year. The individual's tax return may be mostly complete, and immediately upon reviewing the information and finishing the tax return, the individual can subsequently obtain the tax refund. For example, upon completing and filing the tax return, the individual may immediately withdraw money from the tax refund account. The individual may also choose to keep the money in an interest earning account or may move it to a long term savings account. In essence, the tax refund is available for immediate access immediately upon filing the tax return (without waiting for the tax authority to process the return). Also, the individual is in control of the tax refund account (and investment decisions) immediately upon filing the tax return.

Figure 3:
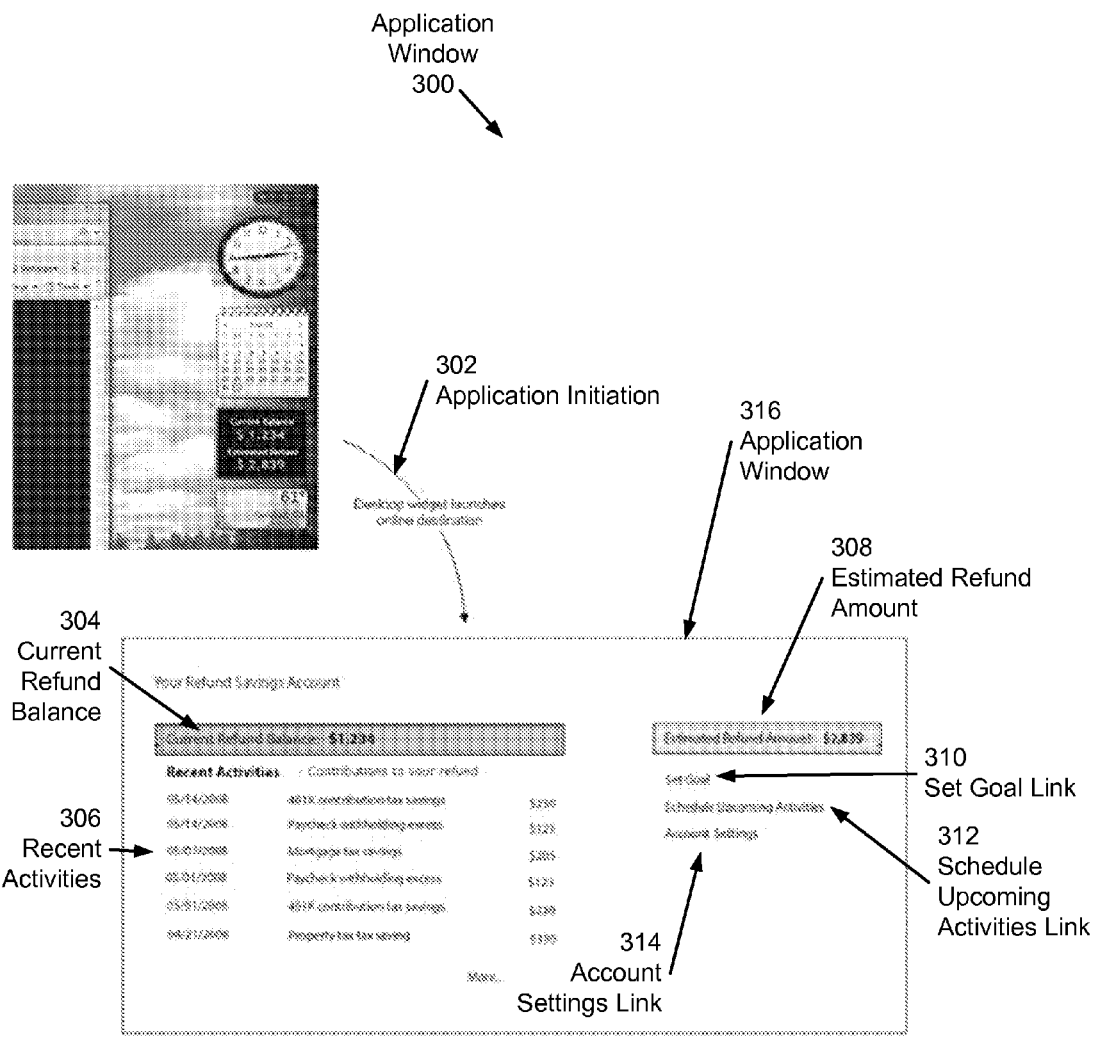
FIG. 3 shows a screenshot example of at least a portion of a system in accordance with one or more embodiments of the invention.

FIG. 3 shows a screenshot example of a system in accordance with one or more embodiments of the invention. FIG. 3 shows an example of a widget appearing on a graphical user interface (GUI) which displays an application window (300) once started. The tax refund account application (316) is started using a widget (302) displayed on the GUI. Upon starting the tax refund account application (316), the information relevant to the refund savings account is displayed.

In one or more embodiments of the invention, the current refund balance (304) is displayed. In FIG. 3, a value of $1,234 is displayed. The $1,234 figure represents the best (and most accurate) estimate of the current balance of the tax refund if the individual were to file a tax return at the time of display. It reflects the current balance, so future changes (for example a contribution taking place the next day after viewing the account) might result in a different value being displayed in the current refund balance. The balance often involves information gathered from a variety of sources, including both historic (e.g., prior year tax returns, demographic data, etc.) and real-time data from sources such as online bank accounts, tax preparation software, financial management software, investment accounts, etc.

In one or more embodiments of the invention, the recent activities (306) are displayed. The list of recent activities reflects activities that have occurred in the past that impact the tax refund. For example, the first item in the list displays that the individual, on May 14, 2008, made a 401K contribution tax savings in the amount of $230, with the contribution going towards their tax refund. In one or more embodiments of the invention, this activity is accounted for and reflected in the value of the current refund balance (304). The list of recent activities (306) may also configurably display activities occurring within the past week, month, or tax year.

Continuing with FIG. 3, the estimated refund amount (308) is displayed in accordance with one or more embodiments of the invention. The estimated refund amount is an estimation of the tax refund that the individual receives based on taking into consideration future activities that may impact the tax refund. For example, 401K contributions, child care expenses, and mortgage payments may impact the tax refund and may be calculated in determining the estimated refund amount (308). In one or more embodiments of the invention, the estimated refund amount (308) is calculated by taking into consideration future recurring events, for example a monthly 401K contribution, as well as one-time occurring events such as a major charitable donation. As discussed previously, determining the estimated refund amount (308) often involves information gathered from a variety of sources, including both historic (e.g., prior year tax returns, demographic data, etc.) and real-time data from sources such as online bank accounts, tax preparation software, financial management software, investment accounts, etc.

In one or more embodiments of the invention, this information can be used to determine future events that may occur that may impact the estimated refund amount (308). For example, when the individual makes a charitable donation at the end of the year in the previous tax year, the refund savings account can automatically calculate such a charitable donation for the current tax year that is included in the calculation of the estimated refund amount (308). In one or more embodiments of the invention, the individual is able to modify the automatic events created by the application in evaluating information from a prior year tax return, an online account owned by the individual, or demographic data by either removing the event or adjusting the amount that the event impacts the estimated refund amount (308). In one or more embodiments of the invention, upon maturity of the event generated by the application, the event appears in the recent activities (306).

Continuing with FIG. 3, the individual may set a goal for the targeted refund amount using a set goal link (310) for the targeted refund amount in accordance with one or more embodiments of the invention. The targeted refund amount is a value that the individual may wish to receive back upon completion of the tax year and filing of taxes. For example, if the user is seeking a tax refund of $2,000, they may set this value as the targeted refund amount. The application may automatically adjust the tax withholding amounts deducted from each paycheck to reach the goal set by the individual. In one or more embodiments of the invention, the individual is alerted to changes or events that may impact the targeted refund amount. For example, receiving a capital gains distribution that is larger than expected results in an alert from the application notifying the individual of the potential impact to the targeted refund amount. The application may notify the user in a plurality of methods, including a pop-up window, sending an e-mail, or posting a text notification within the application.

In one or more embodiments of the invention, the individual may schedule upcoming activities using a schedule upcoming activities link (312). For example, upcoming activities may include one-time events that may impact the estimated refund amount (308) and include a charitable donation. The upcoming activities may include weekly, bi-weekly, or monthly activities. In one or more embodiments of the invention, when the individual schedules an event that impacts the targeted refund amount, the individual is notified of the impact. The notification (not shown) may be displayed in accordance with one or more of the methods described above in accordance with one or more embodiments of the invention.

In one or more embodiments of the invention, the application displays an account settings link (314) that allows the individual to modify information relevant to the individual and their refund savings account. The account settings link (314) may allow the individual to modify personal information or enter in bank information such that the value of the refund savings account can be transferred upon maturity.

Figure 4:
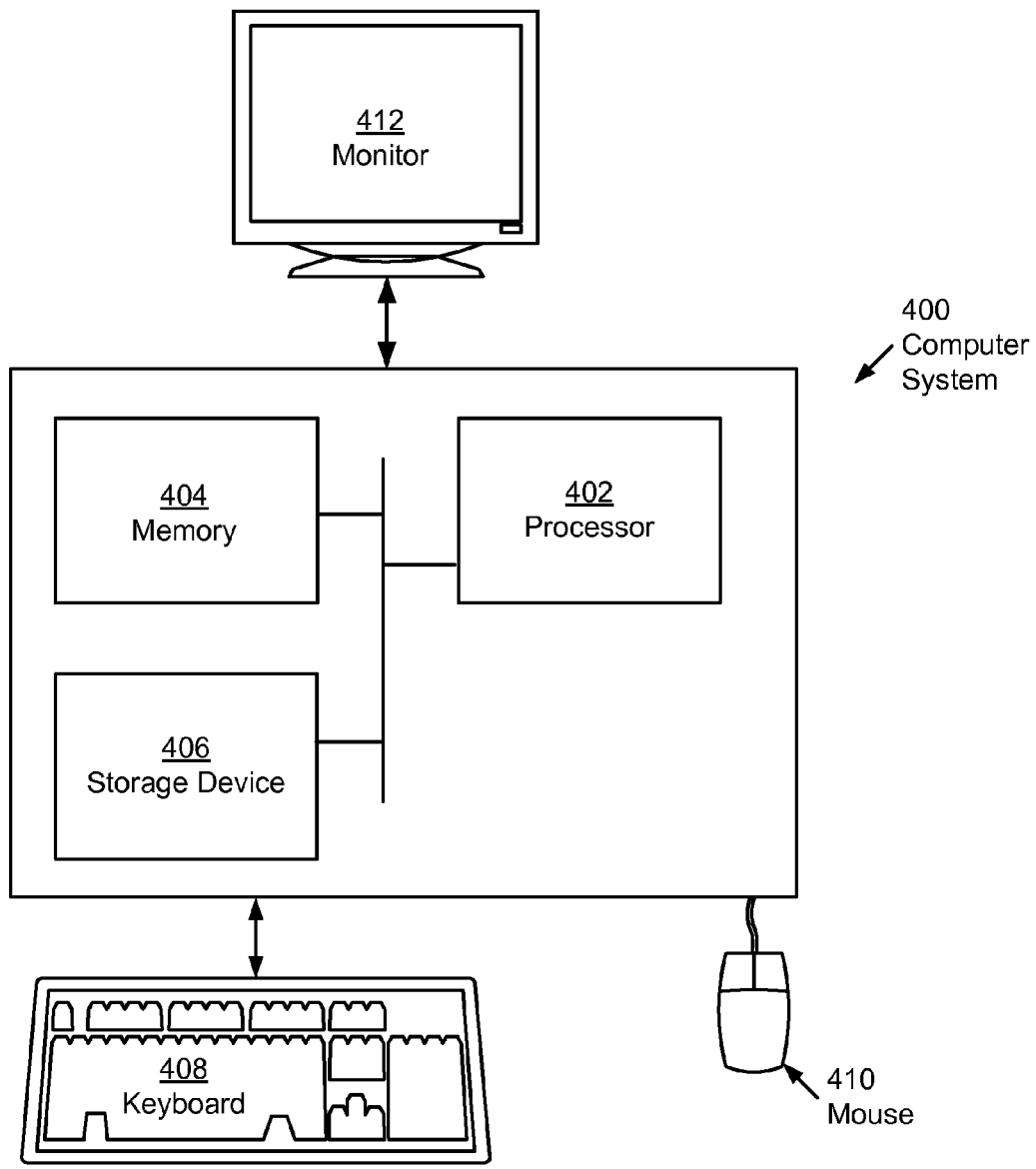
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (not shown) (e.g., a local area network (LAN), a wide area network (WAN) such as the Internet, or any other similar type of network) via a network interface connection. Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one or more embodiments of the invention, the node corresponds to a computer system; however, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a tax refund account by a taxpayer, comprising:
    Obtaining, by a processor, a tax refund account comprising financial information associated with the taxpayer, wherein the financial information comprises tax information of the taxpayer;
    calculating, by said processor, a current refund balance representing a value of the tax refund account for the taxpayer contemporaneously with displaying the current refund balance,
    wherein the value of the tax refund account is based on the tax information and represents an amount the taxpayer contributed-to-date towards a tax year refund;
    displaying, by said processor, a list of contributions to the tax refund account, wherein the list of contributions comprises a plurality of activities that occurred and a value associated with each of the plurality of activities, wherein the plurality of activities contribute towards the current refund balance;
    adjusting, by said processor, the current refund balance based on at least a future recurring event associated with an activity of the plurality of activities in the list of contributions to generate an estimated refund amount representing an estimated value of the tax year refund;
    updating, by said processor, the displayed list of contributions based on maturity of the future recurring event; and
    displaying, by said processor, the estimated refund amount.

2. The method of claim 1, further comprising:
    setting a targeted refund amount by the user; and
    adjusting a tax withholding amount deducted from a paycheck to adhere to the targeted refund amount.

3. The method of claim 1, wherein the list of contributions comprises future contributions.

4. The method of claim 1, wherein the estimated refund amount is based on one-time events specific to the taxpayer.

5. The method of claim 1, wherein the estimated refund amount is based on recurring events specific to the taxpayer.

6. The method of claim 1, further comprising:
    distributing the tax refund by withdrawing funds from the tax refund account.

7. The method of claim 1, further comprising:
    completing a tax return form for the taxpayer by collecting information corresponding to the tax refund account.

8. The method of claim 1, further comprising:
    notifying the taxpayer of a change that impacts the targeted refund amount.

9. A system for managing a tax refund by a taxpayer, comprising:
    a tax refund account created for the taxpayer and comprising financial information associated with the taxpayer, wherein the financial information comprises tax information of the taxpayer; and
    a graphical user interface (GUI) application executing on a processor and configured to:
        calculate a current refund balance representing a value of the tax refund account for the taxpayer contemporaneously with displaying the current refund balance, wherein the value of the tax refund account is based on the tax information and represents an amount the taxpayer contributed-to-date towards a tax year refund;
        display a list of contributions to the tax refund account, wherein the list of contributions comprises a plurality of activities that occurred and a value associated with each of the plurality of activities, wherein the plurality of activities contribute towards the current refund balance;
        adjust the current refund balance based on at least a future recurring event associated with an activity of the plurality of activities in the list of contributions to generate an estimated refund amount representing an estimated value of the tax year refund;
        update the displayed list of contributions based on maturity of the future recurring event; and
        display the estimated refund amount.

10. The system of claim 9, wherein the GUI application is further configured to:
    set a targeted refund amount by the user; and
    adjust a tax withholding amount deducted from a paycheck to adhere to the targeted refund amount.

11. The system of claim 9, wherein the list of contributions comprises future contributions.

12. The system of claim 9, wherein the estimated refund amount is based on one-time events specific to the taxpayer.

13. The system of claim 9, wherein the estimated refund amount is based on recurring events specific to the taxpayer.

14. The system of claim 9, wherein the GUI application is further configured to:
   distribute the tax refund by withdrawing funds from the tax refund account.

15. The system of claim 9, wherein the GUI application is further configured to:
   complete a tax return form for the taxpayer by collecting information corresponding to the tax refund account.

16. The system of claim 9, wherein the GUI application is further configured to:
   notify the taxpayer of a change that impacts the targeted refund amount.

17. A computer readable medium comprising instructions, which when executed by a processor perform:
   obtaining a tax refund account comprising financial information associated with the taxpayer, wherein the financial information comprises tax information of the taxpayer;
   calculating a current refund balance representing a value of the tax refund account for the taxpayer contemporaneously with displaying the current refund balance, wherein the value of the tax refund account is based on the tax information and represents an amount the taxpayer contributed-to-date towards a tax year refund;
   displaying a list of contributions to the tax refund account, wherein the list of contributions comprises a plurality of activities that occurred and a value associated with each of the plurality of activities, wherein the plurality of activities contribute towards the current refund balance;
   adjusting the current refund balance based on at least a future recurring event associated with an activity of the plurality of activities in the list of contributions to generate an estimated refund amount representing an estimated value of the tax year refund;
   updating the displayed list of contributions based on maturity of the future recurring event; and
   displaying the estimated refund amount.

18. The computer readable medium of claim 17, wherein the list of contributions comprises future contributions.

19. The computer readable medium of claim 17, wherein the estimated refund amount is based on one-time events specific to the taxpayer.

20. The computer readable medium of claim 17, wherein the estimated refund amount is based on recurring events specific to the taxpayer.

21. The computer readable medium of claim 17, further comprising instructions, which when executed by the processor perform:
   distributing the tax refund by withdrawing funds from the tax refund account.

22. The computer readable medium of claim 17, further comprising instructions, which when executed by the processor perform:
   completing a tax return form for the taxpayer by collecting information corresponding to the tax refund account.

* * * * *